(Model.)

A. S. SOUTHWICK.
Ornamental Chain.

No. 236,728.                     Patented Jan. 18, 1881.

WITNESSES
J. A. Miller Jr.
Wm. L. Coof

INVENTOR:
Andrew S. Southwick
by Joseph A. Miller
Atty

UNITED STATES PATENT OFFICE.

ANDREW S. SOUTHWICK, OF PROVIDENCE, RHODE ISLAND, ASSIGNOR TO VOSE & SOUTHWICK, OF SAME PLACE.

ORNAMENTAL CHAIN.

SPECIFICATION forming part of Letters Patent No. 236,728, dated January 18, 1881.

Application filed July 21, 1880. (Model.)

*To all whom it may concern:*

Be it known that I, ANDREW S. SOUTHWICK, of the city and county of Providence, and State of Rhode Island, have invented a new and useful Improvement in Ornamental Chains; and I hereby declare that the following is a full, clear, and exact description of the same, reference being had to the accompanying drawings, forming part of this specification.

This invention has reference to an improvement in that class of chains in which a number of rings, links, or units are secured together by means of wire passing through the rings, so as to form a band of any desired width and length. Such chains have heretofore been made by using a continuous length of wire, and also by passing pins or staples through the rings, one for each row, and clinching such pins or staples over washers, such washers being arranged one within the interior of each ring or unit.

The present invention consists in uniting the rings or units by means of pins provided at one end with a washer perforated to receive the adjacent pin, or by means of pins passing through washers placed on the edge and extending from one ring to the other, as will be more fully set forth hereinafter.

Figure 1:
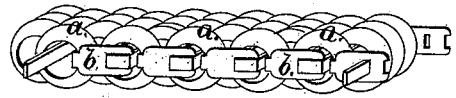
Figure 2:
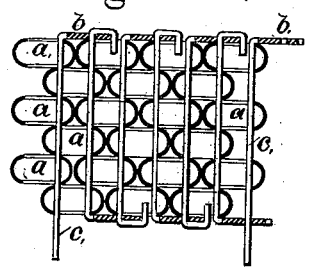
Figure 4:
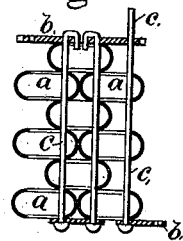
Figure 3:
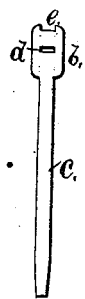
Figure 5:
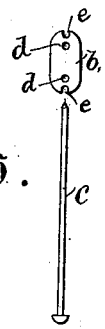

Figure 1 is a perspective view of a chain in which the links are secured by pins, one end of which is provided with a perforated washer. Fig. 2 is a sectional view of a piece of ornamental chain, showing the manner in which the pins provided with a washer at one end are interlocked and the rings secured. Fig. 3 is a view of a pin provided with a washer at one end; and Fig. 4 is a sectional view of a piece of chain secured by means of pins passing through washers placed on the outer edge of the chain, extending from one link to the other. Fig. 5 is a view of a pin and a washer.

In the drawings, $a\,a$ are the links or units out of which the chain is formed. $b\,b$ are washers placed on the edges of the chain, extending from one ring or unit to the other. They may be of the same color as the units, but a desirable effect is produced by making them of a different color.

Washers have heretofore been placed within the rings forming the edges of the chain; but such rings had to be especially constructed with a smaller opening toward the chain, so that the washer could be inserted from the outer side and could rest against a flange on the inner side of the ring or unit, and the clinching of the pins within the ring required considerable time and skill. By placing the washers on the outside, extending from one link to the other, the washers form a chain and increase the durability of the structure.

The washers may form part of the pins $c\,c$, as is shown in Figs. 1, 2, and 3, or they may be made separate, as shown in Figs. 4 and 5. In either case the pins pass through the rings or units so as to secure the same together, as is shown in Figs. 2 and 4, and in either case are the ends of the pins clinched over the washer on the outside of the rings or units.

When the pin $c$ and washer $b$ are made in one piece the washer is provided with a slit, $d$, and the recess $e$, and the washer is bent at right angles with the pin. The pin is passed through the rings or units and through the slit $d$ in the washer of the previously-inserted pin, the end is bent over the washer into the recess $e$, so that each pin passes through the washer of the preceding pin and is clinched on the same. A strong and durable ornamental chain is thus produced, readily distinguished from similar chains previously made, which can be more cheaply constructed, on which the washers form an ornamental edge to the chain.

Having thus described my invention, I claim as new and desire to secure by Letters Patent—

1. As an improved article of manufacture, an ornamental chain composed of a number of rows of links, $a$, fastening-pins $c$, and washers $b$, arranged exteriorly of the links, and extending from one link to that next adjacent, and adapted to receive and retain the pins, substantially as described.

2. In an ornamental chain composed of a number of connected rows of links, the washers $b$, arranged exteriorly of the links, and the pins $c$, for connecting the links, passed through and clinched over such washers, substantially as shown and described.

ANDREW S. SOUTHWICK.

Witnesses:
JOSEPH A. MILLER,
JOSEPH A. MILLER, Jr.